United States Patent

Suffi

[11] Patent Number: 5,260,994
[45] Date of Patent: Nov. 9, 1993

[54] MAINTENANCE TERMINATION UNIT MODULE

[75] Inventor: Lou Suffi, Westchester, Ill.

[73] Assignee: Reliance Comm/Tec Corporation, Chicago, Ill.

[21] Appl. No.: 765,558

[22] Filed: Sep. 25, 1991

[51] Int. Cl.$^5$ .................. H04M 1/24; H04M 3/08; H04M 3/22; H05K 1/14
[52] U.S. Cl. ............................. 379/399; 379/27; 379/332; 361/736; 439/676
[58] Field of Search ............. 379/19, 21, 23, 24, 379/26, 27, 29, 332, 399; 361/119, 392, 395; 439/676

[56] References Cited

U.S. PATENT DOCUMENTS

| | | | |
|---|---|---|---|
| 3,975,664 | 8/1976 | Baumbach | 317/66 |
| 4,209,671 | 6/1980 | Charles et al. | 379/21 |
| 4,588,238 | 5/1986 | Mickelson et al. | 379/399 |
| 4,600,816 | 7/1986 | McDermott | 379/398 |
| 4,729,055 | 3/1988 | Dorival et al. | 361/119 |
| 4,730,229 | 3/1988 | De Luca et al. | 361/119 |
| 4,733,325 | 3/1988 | Loesch | 361/119 |
| 4,736,269 | 4/1988 | Amein et al. | 361/119 |
| 4,782,480 | 11/1988 | Hargrave et al. | 379/332 |
| 4,809,323 | 2/1989 | Collins et al. | 379/399 |
| 4,910,770 | 3/1990 | Collins et al. | 379/399 |
| 4,919,544 | 4/1990 | Graham | 379/399 |
| 4,932,051 | 6/1990 | Karen et al. | 379/399 |
| 4,945,560 | 7/1990 | Collins et al. | 379/399 |
| 4,949,376 | 8/1990 | Nieves et al. | 379/399 |
| 4,979,209 | 12/1990 | Collins et al. | 379/399 |
| 5,034,846 | 7/1991 | Hodge et al. | 379/331 |
| 5,175,662 | 12/1992 | DeBalko et al. | 379/412 X |

OTHER PUBLICATIONS

Reliance Comm/Tec, "Products and Systems Catalog" 1991, Section 8, pp. 7 & 9.

Primary Examiner—James L. Dwyer
Assistant Examiner—Harry S. Hong
Attorney, Agent, or Firm—Trexler, Bushnell, Giangiorgi & Blackstone, Ltd.

[57] ABSTRACT

A maintenance termination unit module for housing electronic equipment including a maintenance termination unit electronic circuit for use in a telecommunications network, comprises a housing portion and a base portion. The electronic equipment is located within the housing portion, and presents external circuit connection points at electrically conducting elements which are disposed through a base to form a plug portion. The electrically conducting elements are arranged in the plug portion in a configuration which matches a predetermined socket configuration of a type used in telecommunications networks so that the plug portion can be inserted into such a pin socket configuration. The base portion is mountable on the housing portion so that the electrically conducting elements can be electrically connected to the electronic equipment.

15 Claims, 6 Drawing Sheets

MAINTENANCE TERMINATION UNIT MODULE

BACKGROUND OF THE INVENTION

The present invention relates generally to a new and unique external configuration for a maintenance termination unit for use with a telecommunications system. More specifically, the invention relates to a maintenance termination unit module contained within a housing having a standard 5-pin modular configuration so that the termination unit can be inserted or plugged into sockets of the type constructed to accept existing telecommunications equipment housed in similar 5-pin modules.

The circuit construction and operation of maintenance termination units and network interface devices are well known to those skilled in the relevant art. Briefly, the maintenance termination units are used to detect the location of a fault in a telecommunications network up to the point of insertion of the unit into the telecommunications network. The maintenance termination unit has become an important tool to telecommunications companies in recent times due to the fact that many telecommunications firms do not own all of the equipment in or connected to a telecommunications network.

Currently, many users of telecommunications networks own their own telecommunications equipment, and some even own the telecommunications transmission lines leading to their individual locations. Thus, it is important for the telecommunications company to know who owns the faulty portion of the telecommunications network.

By inserting a maintenance termination unit into the telecommunications network, the network can be evaluated and a determination can be made as to whether the fault in the network exists up to that point. Thus, the maintenance termination units are often inserted at the point of demarcation between that portion of the telecommunications network owned by the end user and that portion of the network owned by the telecommunications company. In this manner, the telecommunications company can determine where the fault resides, and who is responsible for the repair. This is desirable due to the high costs attendant with repairs to telecommunications networks.

All maintenance termination units are capable of doing this. However, the insertion of the units of the prior art into the telecommunications network can be quite tedious and time consuming. One such unit is shown in FIG. 2.

Figure 2:
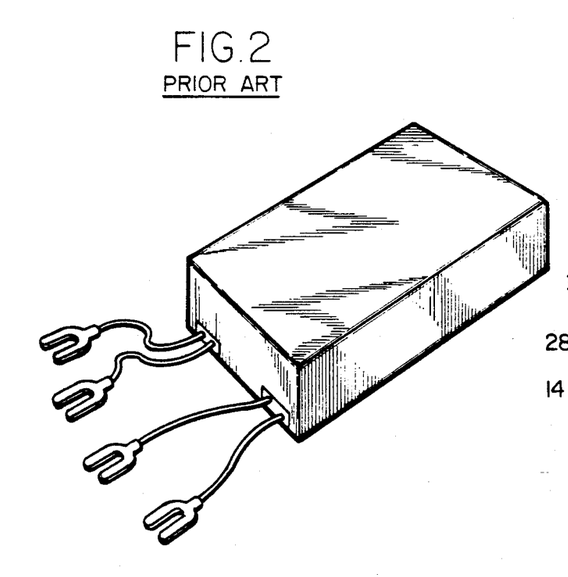
FIG. 2 is a perspective view of a maintenance termination unit of the prior art showing the external terminal lugs.

The maintenance termination units of the type shown in FIG. 2 are encapsulated within a housing by means of an encapsulating material, well known by those skilled in the relevant art. The housing holds a maintenance termination unit printed circuit board bearing the appropriate circuitry, well known in the art. Connections to the printed circuit board project from the housing in the form of wires which terminate at terminal lugs engagable with binding posts which are connectable with the telecommunications network.

Use of the maintenance termination units of the prior art, however, has encountered numerous drawbacks. Because of the use of the terminal lugs and binding posts, the maintenance termination unit must be manually connected into the telecommunications network. This connection process takes time, and is thus labor intensive, thereby resulting in higher repair costs.

Also, because the terminal lugs are external and are connected to the maintenance termination unit by a length of wire, a substantial amount of space is required to connect the unit into the telecommunications network. This presents great difficulty when dealing with a network in which space is at a premium and that already comprises a great number of components housed in a limited amount of space.

Additionally, because the terminal lugs and connecting wires are external of the housing, there is a possibility that they will be damaged in storage, transport, or during use. The maintenance termination unit module, constructed according to the teachings of the present invention, alleviates many of these drawbacks.

OBJECTS AND SUMMARY OF THE INVENTION

A general object of the present invention is to provide a novel and improved modular construction for a maintenance termination unit.

A more specific object of the invention is to provide a 5-pin modular configuration for a maintenance termination unit.

Another object of the present invention is to provide a maintenance termination unit module which is easier and faster to install in a telecommunications network than other, currently available maintenance termination units.

A further object of the present invention is to provide a maintenance termination unit module which is less expensive to use than other, currently available maintenance units currently available.

An additional object of one embodiment of the invention is to provide a maintenance termination unit module which houses both a maintenance termination unit and a network interface device.

Another object of the present invention is to provide a maintenance termination unit module which does not require the connection of terminal lugs or the like to external binding posts or the like.

A maintenance termination unit module, constructed according to the teachings of the present invention, for housing electronic equipment including a maintenance termination unit electronic circuit for use in a telecommunications network, comprises a housing portion and a base portion. The electronic equipment is located within the housing portion, and presents external circuit connection points at electrically conducting elements which are disposed through a base to form a plug portion. The electrically conducting elements are arranged in the plug portion in a configuration which matches a predetermined socket configuration of a type used in telecommunications networks so that the plug portion can be inserted into such a pin socket configuration. The base portion is mountable on the housing portion so that the electrically conducting elements can be electrically connected to the electronic equipment.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

DETAILED DESCRIPTION OF THE ILLUSTRATED EMBODIMENTS

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 1:
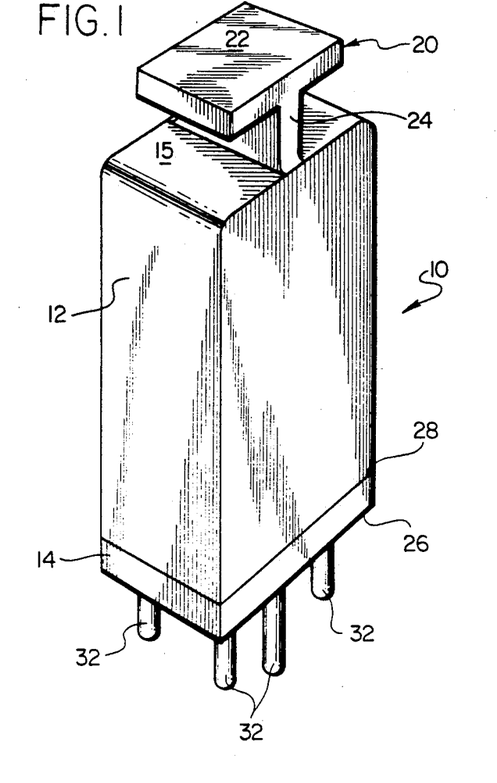
FIG. 1 is a perspective view of a maintenance termination unit module, constructed according to the teachings of the present invention, showing the external configuration thereof.

Referring initially to FIG. 1, a maintenance termination unit (hereinafter "MTU") module 10, constructed according to the teachings of the present invention and for use in a telecommunications network, is illustrated.

Figure 3:
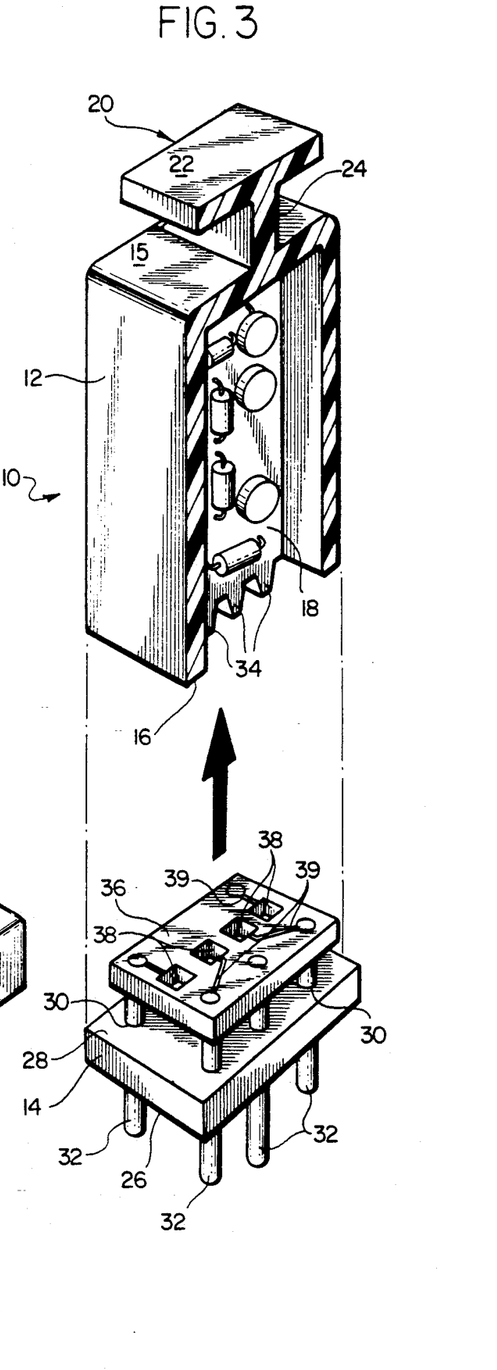
FIG. 3 is an exploded perspective view of the maintenance termination module of FIG. 1, showing the internal construction thereof.

The MTU module 10 generally comprises a housing portion 12 and a base portion 14, shown clearly in FIG. 3. The housing portion 12 is generally rectangular in shape, and has a substantially box-like configuration, and an open end 16. The open end 16 communicates from the exterior to the interior of the housing portion 12. The housing 12 is preferably constructed of a strong plastic material, for example, although other electrically insulating materials could be effectively utilized.

The open end 16 and the interior of the housing portion 12 are of sufficient dimensions to accept and retain a printed circuit board 18, as shown in FIG. 3, bearing electronic circuitry which performs the telecommunications functions of the MTU. The MTU circuitry is only diagrammatically illustrated herein, since its structure and function are well known to those skilled in the relevant art.

The housing portion 12 also has means in the form of a T-shaped handle 20 for allowing easy gripping and moving of the MTU module 10, consisting of a base 22 and a leg 24 extending from an end 15 of the housing 12 opposite to the open end 16. By gripping the handle 20, a workman can easily manipulate the MTU module 10, plug it into the telecommunications network, or remove it from the network. Other constructions and configurations of the handle 20 are also possible.

The base portion 14 of the MTU module 10 is composed of an insulating material, such as plastic, and the like, and is also substantially rectangular in shape, having a first side 26 and a second side 28. The first side 26 is intended to confront a socket located in the telecommunications network, while the second side 28 is intended to confront and close the open end 16 of the housing portion 12.

The base portion 14 has a plurality of through apertures 30 which communicate from the first side 26 to the second side 28. The through apertures 30 are preferably arranged on the base portion 14 in a configuration which corresponds to the common 5-pin configuration used most frequently in telecommunications protector modules. Other configurations might be employed within the scope of the invention.

Electrical contact means in the form of an electrically conducting element or pin 32 is disposed through each of the apertures 30 from the first side 26 to the second side 28 of the base portion 14. The elements 32 are preferably generally cylindrical in form, but can be of any construction or configuration suitable for insertion into corresponding electrically conducting sockets in the telecommunications network, or other circuitry.

Adjacent the second side 28 of the base portion 14, the elements 32 are electrically connected to the printed circuit board 18 and the circuitry contained thereon. This connection can be effected in a plurality of ways. The elements 32 may be directly wired to appropriate contact portions 34 on the printed circuit board 18, or a contact board 36, shown in FIG. 3, may be used.

The contact board 36 is generally another printed circuit board having contact areas 38 which accept and electrically contact the contact portions 34 on the printed circuit board 18. The construction of the contact areas 38 on the contact board 36 complement the construction of the contact portions 34 on the printed circuit board 18.

The elements 32 are connected directly to the contact board 36 which has conductive strips 39 connecting each pin 32 to a corresponding one of the contact areas 38. Thus, the contact areas 38 become a mere electrical extension of the electrically conducting elements 32. When the base portion 14 is mounted onto the housing portion 12, thereby closing its open end 16, the contact portions 34 of the printed circuit board 18 are inserted into the contact areas 38 on the contact board 36. In this manner, the printed circuit board 18 is electrically connected to the elements 32, and thereby to the telecommunications network.

To construct the embodiment of the present invention shown in FIG. 1, the printed circuit board 18 is inserted through the open end 16 and into the interior of housing portion 12 so that the contact portions 34 of the printed circuit board 18 are adjacent the open end 16. If the elements 32 are to be directly wired to the contact portions 34 on the printed circuit board 18, those connections can be made at this time. If the elements 32 are to be connected directly to the contact board 36, then those connections can be made at this time as well.

To complete the construction of the MTU module 10, the base portion 14 is placed on the housing portion 12 so that the second side 28 of the base portion 14 engages and covers the open end 16 of the housing portion 12. If the contact board 36 is used, the contact portions 34 are simultaneously inserted into the contact areas 38 on the contact board 36 as the second side 28 contacts the open end 16. Now the MTU module 10 is ready for insertion into the telecommunications network so as to complete the telecommunications circuit shown schematically in FIG. 6.

Figure 6:
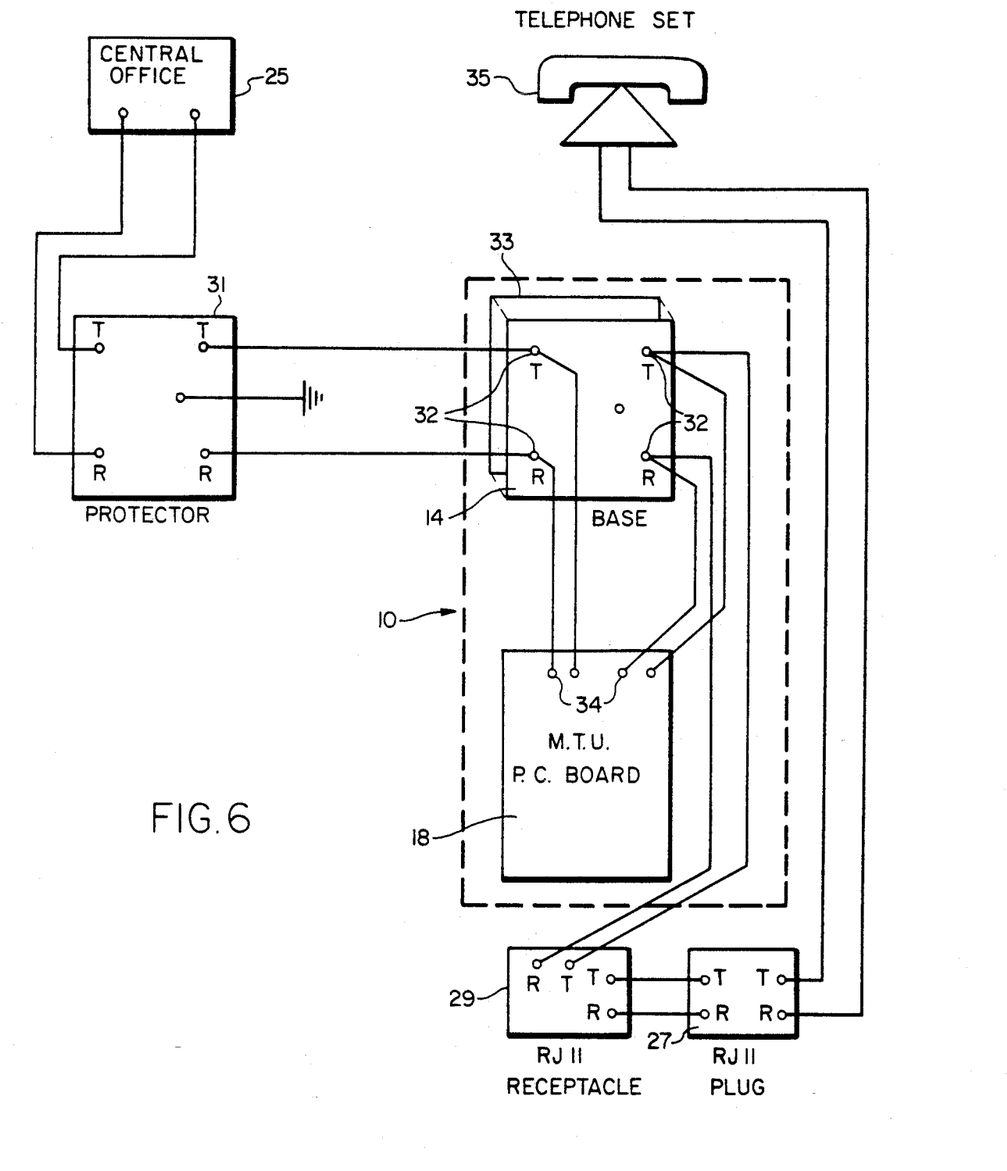
FIG. 6 is a block diagram of the wiring configuration of the module of FIG. 1 when connected in a telecommunications network.

Referring briefly to FIG. 6, the MTU module 10 enables testing of the telecommunications line from the central office 25 (C.O.) up to the point at which the customer's equipment (e.g. telephone set 35) joins the line. The point of demarcation between the customer's equipment and all remaining telephone company equipment in the system is defined by a standard RJ-11 type plug 27 and receptacle 29.

A protector 31 is also employed in the line from the C.O. 25, preferably closely adjacent the MTU module 10, which is, in turn, located closely adjacent the RJ-11 receptacle 29. The circuit of the MTU printed circuit board 18 can be electrically controlled from the C.O. 25 to electronically temporarily disconnect the customer equipment at the RJ-11 receptacle 29 to permit the lines and equipment from the C.O. 25 up to that point to be tested directly from the C.O. 25. It will be seen that the pins 32 of the module 10 are electrically connected by way of a 5-pin socket 33, indicated somewhat diagrammatically below base 14 to respective tip (T) and ring (R) terminals of the protector 31 and the RJ-11 receptacle 29, respectively.

Figure 4:
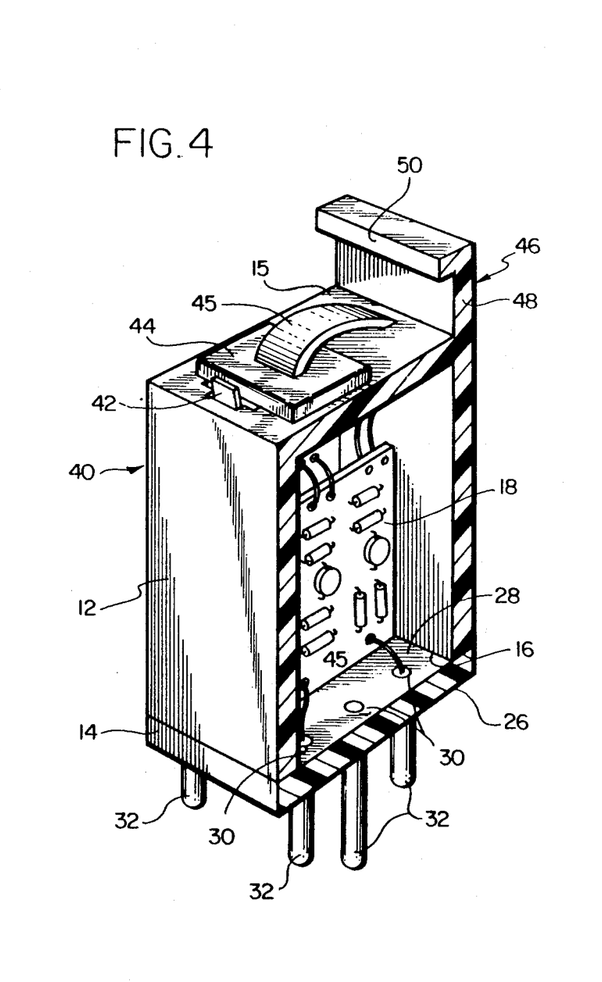
FIG. 4 is a perspective view of a combined maintenance termination unit/network interface device module, constructed according to the teachings of the present invention with a portion thereof removed to show the internal construction thereof, having a built-in RJ-11 type plug and receptacle.

Another embodiment of the present invention, a maintenance termination unit/network interface device (hereinafter "MTU/NID") module 40 is illustrated in FIG. 4. This embodiment of the invention is substantially similar to the above-disclosed embodiment, except for the differences to be noted in the following paragraphs.

The housing portion 12 of the MTU/NID module 40, shown in FIG. 4, encloses a printed circuit board 18 having both MTU circuitry and also mounts a network interface device (hereinafter "NID") consisting of an RJ-11 type socket or receptacle 42 and plug 44, whereas the embodiment shown in FIG. 1 houses only MTU circuitry. By providing both the MTU and the NID, the MTU/NID module 40 eliminates much of the space required for separate NID's, which is a significant advantage considering the often cramped quarters found in a telecommunications network. Also, because additional multiple connections to separate NID elements are not needed, the MTU/NID module 40 can save time required to troubleshoot and/or to repair the network, thereby resulting in greater revenues to the telecommunications network operator.

Figure 7:
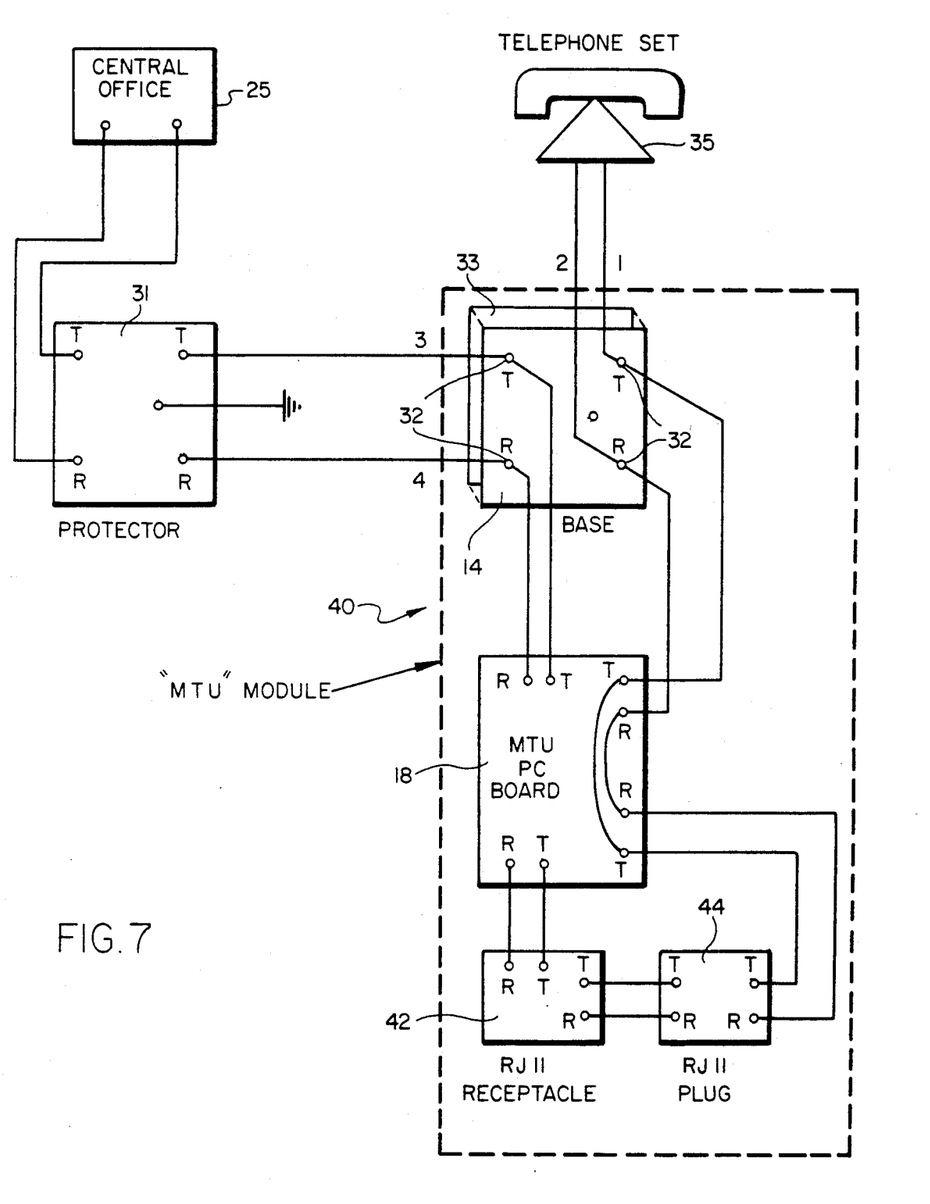
FIG. 7 is a block diagram of the wiring configuration of the module of FIG. 4 when connected in a telecommunications network.

The RJ-11 receptacle 42 and an RJ-11 plug, which comprise the NID are disposed on an end 15 of the housing portion 12 opposite to the open end 16. The plug 44 and receptacle 42 are electrically connected through the housing portion 12 to the printed circuit board 18, as shown schematically in FIG. 7. Thus, the NID provides a point for disconnecting customer equipment from the telecommunications network, as discussed above, and defines the demarcation between the portion of the network owned by the network operator and the portion of the network owned by the end user or customer.

Because the NID is disposed on the end 15 of the housing portion 12 opposite to the open end 16, the construction of the handle 20 is altered to form a grip 46. Specifically, the grip 46 has a projecting portion 48 and a tang 50. The projecting portion 48 extends outwardly from and substantially perpendicularly to the end 15 of the housing portion 12 opposite to the open end 16. The tang 50 is connected to the projecting portion 48 on an end thereof opposite to the end connected to the housing portion 12. The tang 50 extends away from and substantially perpendicularly to the projecting portion 48. This construction of the grip 46 facilitates manipulation of the MTU/NID module 40 by a workman.

The MTU/NID module 40 is constructed in a method substantially similarly to the MTU module 10, as disclosed above. The NID can be connected electrically to the printed circuit board 18 before the board 18 is inserted into the housing portion 12. For example, the RJ-11 receptacle 42 can be provided as an integral, pre-wired part of the printed circuit board 18. In this way, the RJ-11 receptacle 42 can slide or snap into an appropriately configured hole in the housing portion 12 upon insertion of the printed circuit board 18 into the housing portion 12.

Then, a connector portion 45 for the RJ-11 plug 44 can also be electrically connected to the printed circuit board 18 prior to its insertion into the housing portion 12 and then fed through an appropriate hole in the housing portion 12 to be joined with the plug 44. The MTU/NID module is completed by the addition of base 28 and appropriate means connecting pins 32 to the MTU board 18 in one of the manners described above with reference to FIG. 1. In FIG. 4, connecting wires or leads 45 are shown. Upon completion, the MTU/NID module 40 can be plugged into a 5-pin socket in the telecommunication network in order to complete the circuit illustrated schematically in FIG. 7.

Figure 5:
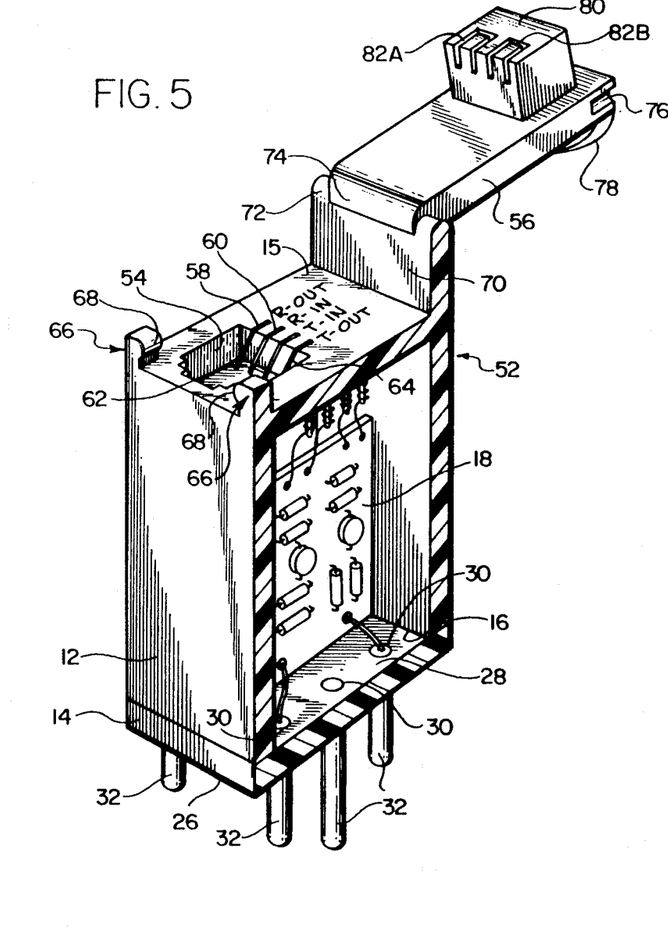
FIG. 5 is a perspective view of an alternative embodiment of the module of FIG. 4 with a portion thereof removed to show its internal construction, having a hinged cover and a receptacle forming an RJ-11 type connector.
Figure 9:
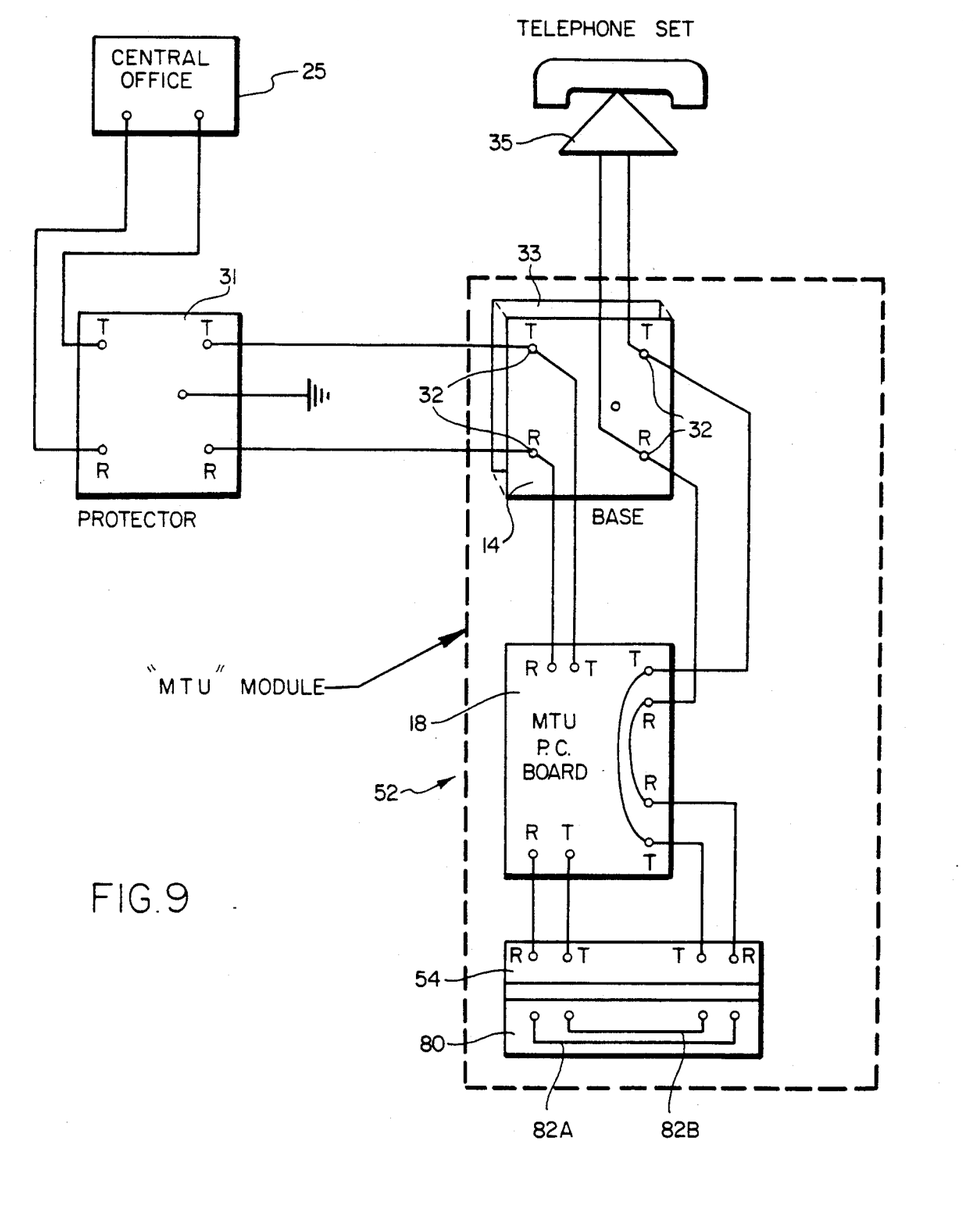
FIG. 9 is a block diagram of the wiring configuration of the module of FIG. 5 when connected in a telecommunications network.

Yet another embodiment of the present invention is illustrated in FIG. 5, with the corresponding circuit connections shown in FIG. 9. The device shown in FIG. 5 is another MTU/NID module 52 substantially similar to the MTU/NID module 40 depicted in FIG. 4. However, the NID portion of the module 52 differs substantially in construction from that of the module 40.

The NID illustrated in FIG. 5 comprises an RJ-11 receptacle 54 and a mating RJ-11 plug mounted on a hinged cover 56, both disposed on the housing portion 12 on an end 15 thereof opposite to the open end 16. The RJ-11 receptacle 54 is molded into the housing portion 12 and has at least four electrical contacts, labeled in accordance with standard telecommunications nomenclature, R-OUT 58, R-IN 60, T-IN 62, and T-OUT 64, as shown in FIG. 5. The electrical contacts 58 through 64 are electrically connected to the MTU printed circuit board 18 disposed within the housing portion 12.

Looking portions 66 are disposed on the housing portion 12 proximate to the RJ-11 receptacle 54. The locking portions 66 extend outwardly away from the end housing portion 12 in a substantially perpendicular fashion on oppositely adjacent sides of the housing portion 12. A tab 68 is disposed on each of the locking portions 66 on an end thereof opposite to the end connected to the housing portion 12.

The tabs 68 and the locking portions 66 are composed of a flexibly resilient material so that they may flex in order to accept portions of the hinged cover 56, as will be described hereinbelow. The tabs 68 have a substantially rounded exterior surface which facilitates their engagement with the cover 56.

A cover mount 70 is disposed on the top 15 of the housing portion 12 on an end thereof opposite to the locking portions 66. The cover mount 70 projects outwardly, substantially perpendicularly from the housing portion 12. The cover mount 70 has a hinge portion 72 on an end thereof opposite to the end connected to the top 15 of the housing portion 12. The cover mount 70 also provides means for manipulating the MTU/NID module 52.

The hinge portion 72 is constructed so as to pivotally accept a complementary hinge portion 74 disposed on the hinged cover 56. When the hinge portion 74 on the hinged cover 56 is inserted into the hinge portion 72 on the cover mount 70, the hinged cover 56 is pivotally attached to the housing portion 12, and is capable of pivotal rotation between an open position and a closed position, as will be described herein.

A pair of depressions or recesses 76 are disposed on the hinged cover 56 on an end thereof opposite to the hinge portion 74. The recesses 76 are constructed so as to releasably accept the tabs 68 on the locking portions 66 when the cover 56 is in the closed position. Thus, the tabs 68 and the recesses 76 form locking means capable of releasably locking the hinged cover 56 in the closed position.

A handle portion 78 projects upwardly away from the hinged cover 56 in a substantially perpendicular fashion. The handle portion 78 facilitates gripping of the hinged cover 56 and also is useful in pivoting the cover 56 between the closed and the open position. Preferably, the handle portion 78 is disposed above the recesses 76 so that application of a properly directed force of sufficient magnitude to the handle portion 78 can move the tabs 68 into and out of residence inside the recesses 76.

The RJ-11 plug 80 is configured and located so as to be insertable into the RJ-11 receptacle 54 on the MTU/NID module 52 when the cover 56 is in the closed position. Accordingly, the closed position is defined by the plug disconnect 80 being inserted into the RJ-11 receptacle 54, and the open position is defined by the plug disconnect 80 being separated from the RJ-11 receptacle 54.

The plug disconnect 80 has a pair of substantially U-shaped electrical contacts 82A and 82B. These contacts 82A and 82B are intended to form electrical connections between appropriate ones of the four electrical contacts 58 through 64 disposed in the RJ-11 receptacle 54 when the hinged cover 56 is in the closed position.

Figure 8A:
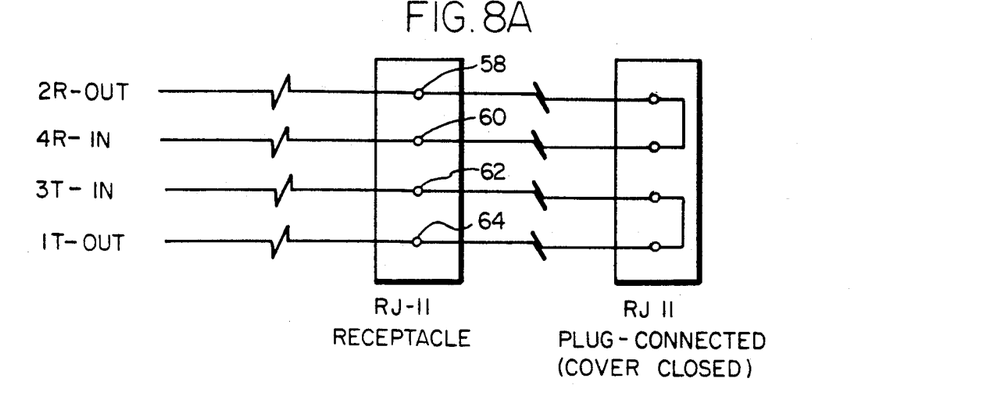
FIG. 8A through FIG. 8C are schematic diagrams of the connections made via the RJ-11 connector in the embodiments of the invention shown in the previous Figures.

Specifically, as shown schematically in FIG. 8A, when the cover 56 is in the closed position, the electrical contact 82A forms an electrical connection between R-OUT 58 and R-IN 60, while the electrical contact 82B forms an electrical connection between T-IN 62 and T-OUT 64. This completes the circuit of the MTU board 18, placing the MTU in circuit with the line from the C.O. 25 and also connecting the customer equipment to the incoming line and MTU. When the hinged cover 56 is closed, and the MTU/NID module 52 is inserted into the telecommunications network, the circuit is competed, as shown schematically in FIG. 9.

Figure 8B:
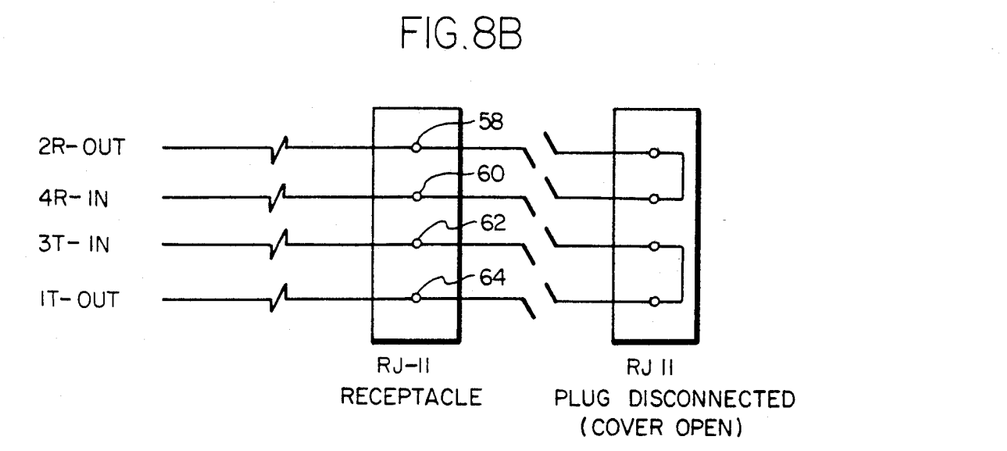
Figure 8C:
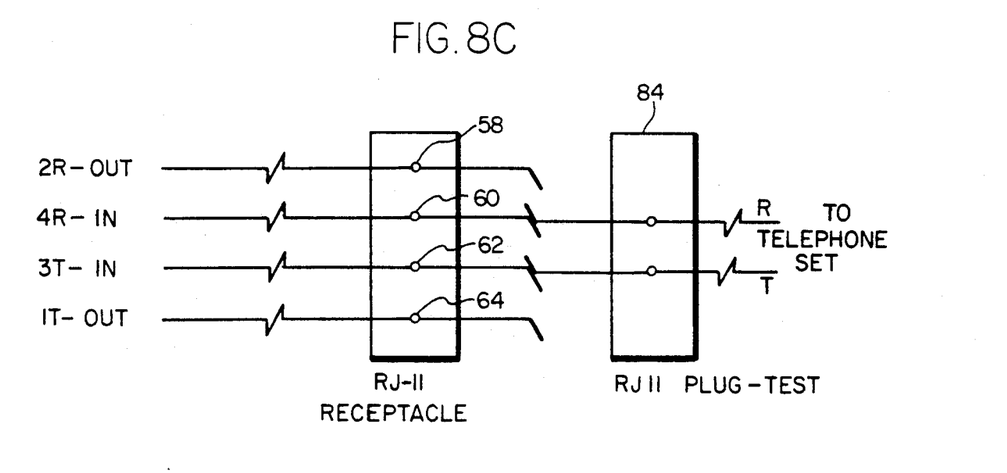

When the hinged cover 56 is pivotally rotated into the open position, the disconnect plug 80 is removed from the RJ-11 receptacle 54. By doing this, all of the electrical connections formed by the electrical contacts 82A and 82B are broken, as illustrated schematically in FIG. 8B. With the disconnect plug 80 removed from the RJ-11 receptacle 54, the circuitry is open and incomplete, and the customer equipment is disconnected. To permit the customer to test the customer equipment (i.e., inside lines, etc.), an RJ-11 plug 84 connected to a properly operating telephone set, or other telecommunications instrument, can be inserted into the RJ-11 receptacle 42 or 54 for testing in place of plug 44 or 80, as shown schematically in FIG. 8C.

In this case, the T-IN and R-IN lines are connected directly to the telephone set. Thus, if the telephone set operates properly, the problem is in the customer's inside lines or other customer equipment. If the instrument fails to operate, the problem is in the service provider's equipment. In normal operation, however, the telephone set or other instrument is connected as shown in one of FIGS. 6, 7, or 9.

The MTU/NID module 52 possesses all of the above-stated advantages. Additionally, the module 52 simplifies telecommunications network testing for the service provider. The module 52 is a space-saver and is easier and less costly to install than other, currently available MTU's and NID's.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. A maintenance termination unit module for housing telecommunications equipment including at least a maintenance termination unit electronic circuit, comprising: a housing portion and a base portion; a maintenance termination unit electronic circuit disposed within the housing portion; a plurality of electrically conducting elements disposed through the base portion to form a plug portion; the electrically conducting elements being arranged in the plug portion in a configuration which matches a pre-determined socket configuration of a type used in a telecommunications network for facilitating insertion of the plug portion into a socket of the pre-determined configuration; the housing portion being mountable on the base portion; and connection means associated with the electronic circuit and the electrically conducting elements for electrically connecting the electrically conducting elements to the electronic circuit.

2. A module as defined in claim 1 wherein the telecommunications equipment further includes a network interface device disposed on the housing portion.

3. A module as defined in claim 1 further comprising handle means disposed on the module for facilitating manipulation of said module.

4. A module as defined in claim 1 wherein the connecting means comprises wires for directly wiring the electrically conducting elements to the telecommunications equipment.

5. A module as defined in claim 1 wherein the connecting means comprises a contact board; the electrically conducting elements being electrically connected to the contact body; the telecommunications equipment having contact portions; and the contact board including contact areas for engaging said contact portions of the telecommunications equipment.

6. A maintenance termination unit module for housing telecommunications equipment including at least a maintenance termination unit electronic circuit, the module comprising: a housing portion and a base portion; the electronic circuit being disposed within the housing portion; a plurality of electrically conducting elements disposed through the base portion to form a plug portion; the electrically conducting elements being arranged in the plug portion in a configuration which matches a pre-determined socket configuration of a type used in a telecommunications network for facilitating insertion of the plug portion into a socket of the pre-determined configuration; the housing portion being mountable on the base portion; and connecting means associated with the electronic circuit and the electrically conducting elements for electrically connecting the electrically conducting elements to the electronic circuit; wherein the telecommunications equipment further includes a network interface device disposed on the housing portion.

7. A module as defined in claim 6 wherein the network interface device comprises a receptacle disposed on the housing portion and a mating plug connected to the housing portion; said plug being insertable into the receptacle; and at least one of the receptacle and the plug being electrically connected to the telecommunications equipment.

8. A module as defined in claim 7 wherein the plug and the receptacle are of RJ-11 type.

9. A module as defined in claim 7 wherein the receptacle and mating plug complete a circuit between customer equipment and a telecommunications line from a central office when the plug is inserted into the receptacle.

10. A module as defined in claim 7 wherein the receptacle is capable of accepting a mating plug disposed on customer equipment, the mating plug of the customer equipment being insertable into the receptacle in place of the mating plug connected to the housing portion.

11. A module as defined in claim 7 further comprising a cover pivotally connected to the housing portion; the cover being pivotally movable between a closed position and an open position; the plug being disposed on the cover; the closed position being defined by the plug engaged in the receptacle; and the open position being defined by the plug being removed from the receptacle.

12. A module as defined in claim 11 further comprising a plurality of contacts disposed on the plug for electrically completing a circuit between the maintenance termination unit electronic circuit and the network interface device.

13. A module as defined in claim 11 further comprising locking means for releasably locking the cover in the closed position.

14. A module as defined in claim 13 wherein the locking means comprises locking portions disposed on the housing portion, tabs disposed on the locking portions, recesses disposed on the cover, and the tabs being engagable with the recesses for releasably locking the cover in the closed position.

15. A module as defined in claim 14 wherein the locking portions and the tabs are comprised of a flexible, resilient material for allowing the tabs to flex into and out of engagement with the recesses.

* * * * *

UNITED STATES PATENT AND TRADEMARK OFFICE
CERTIFICATE OF CORRECTION

PATENT NO. : 5,260,994
DATED : November 9, 1993
INVENTOR(S) : Lou Suffi

It is certified that error appears in the above-indentified patent and that said Letters Patent is hereby corrected as shown below:

Column 6, Line 59 " Looking" a should read -- Locking --
Column 9, Line 6 "body" should read -- board --

Signed and Sealed this

Second Day of August, 1994

Attest:

BRUCE LEHMAN

Attesting Officer    Commissioner of Patents and Trademarks